J. NEY.
GRIPPING DEVICE FOR MANUALLY PROPELLED VEHICLES.
APPLICATION FILED FEB. 24, 1913.
1,239,509.
Patented Sept. 11, 1917.
2 SHEETS—SHEET 1.
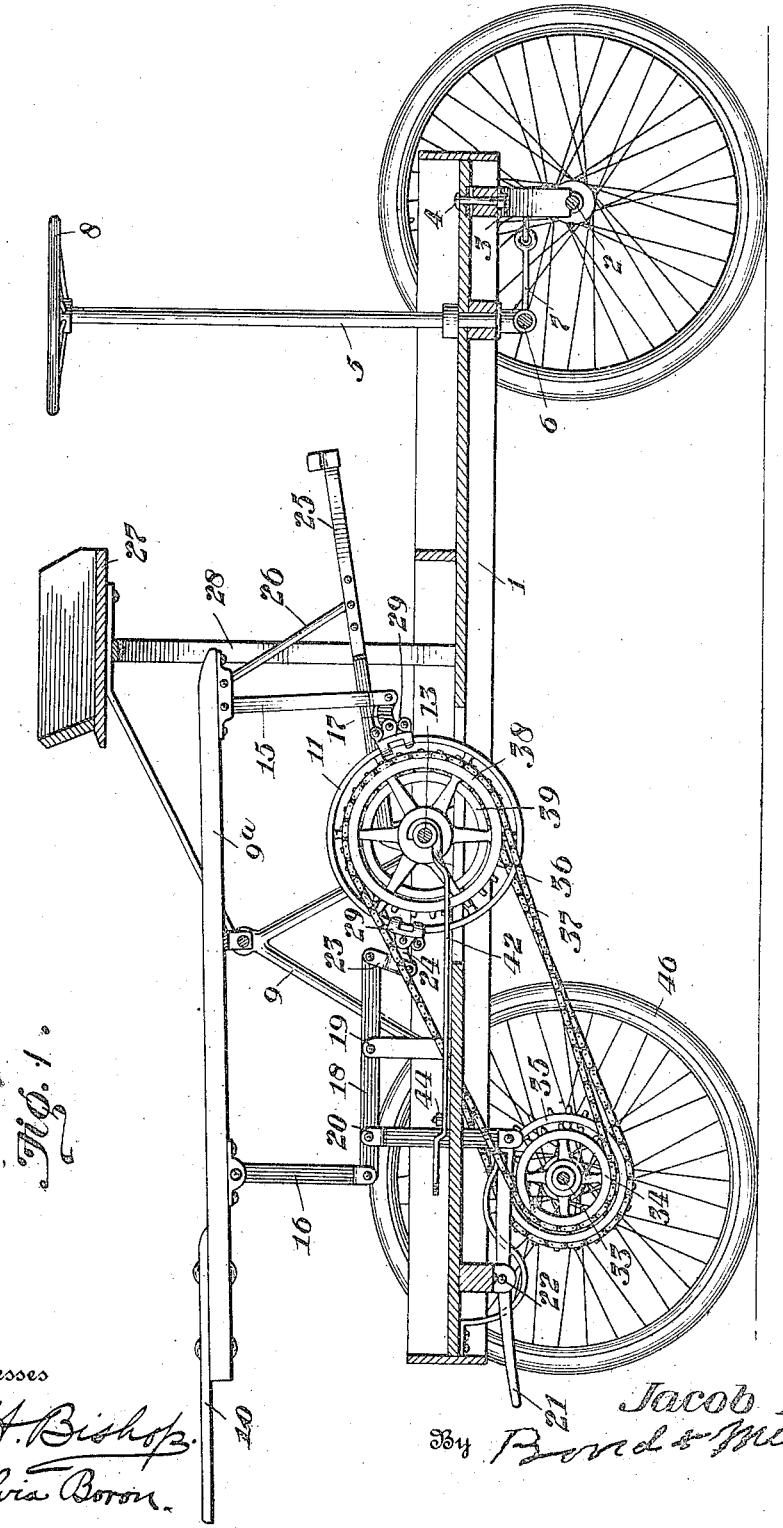

J. NEY.
GRIPPING DEVICE FOR MANUALLY PROPELLED VEHICLES.
APPLICATION FILED FEB. 24, 1913.
1,239,509.
Patented Sept. 11, 1917.
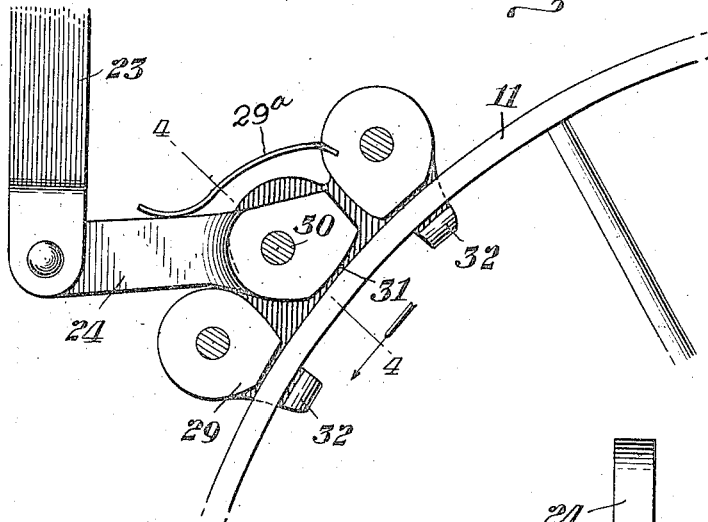
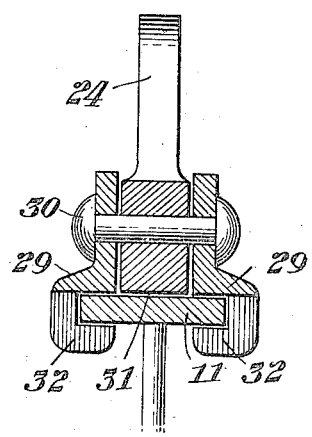
Witnesses
J. H. Bishop.
Sylvia Boron.
Inventor
Jacob Ney.
By Bond & Miller
Attorneys

UNITED STATES PATENT OFFICE.

JACOB NEY, OF CANTON, OHIO.

GRIPPING DEVICE FOR MANUALLY-PROPELLED VEHICLES.

1,239,509.  Specification of Letters Patent.  Patented Sept. 11, 1917.

Application filed February 24, 1913. Serial No. 750,066.

*To all whom it may concern:*

Be it known that I, JACOB NEY, a citizen of the United States, residing at Canton, in the county of Stark and State of Ohio, have invented certain new and useful Improvements in Gripping Devices for Manually-Propelled Vehicles, of which the following is a specification.

My invention relates to gripping devices, in which an oscillating bar or frame is utilized to impart or transmit power by mechanism intermediate the oscillating bar or frame and the driven axle or power shaft.

The objects of the present invention are, first, to provide means whereby power can be produced by one or two persons and in the present instance such power utilized to propel a vehicle, but it will be understood that the power produced may be utilized for other purposes; second, to provide means whereby the driving mechanism can be quickly and easily thrown out of gear; and third, to arrange the propelling mechanism in such a manner that the weight of the operator or operators can be utilized in the producing of power.

These objects together with other objects readily apparent to those skilled in the art, I attain by the construction illustrated in the accompanying drawings, although my invention may be embodied in a variety of other mechanical forms, the construction illustrated being chosen by way of example.

In the accompanying drawings:

Figure 1 is a longitudinal section of a vehicle provided with my improved gripping device;

Fig. 2 is a view showing a portion of the power or grip wheel, also showing the inner side of one of the grip plates and illustrating the grip lever or bar.

Fig. 3 is a transverse section of the grip, said section being taken on line 4—4, except that in Fig. 2 only one plate of the grip is illustrated.

Similar numerals of reference indicate corresponding parts in all the figures of the drawings.

In the accompanying drawings 1 represents the frame or body of the vehicle which may be of any desired construction reference being had to connecting the various parts going to make up the completed structure or vehicle. The front or forward axle 2 is journaled in the yoke 3, which yoke is connected to the frame 1 or its equivalent by the usual king bolt 4. To the bottom or lower end of the steering post 5 is connected the cross arms 6, to which cross arms are connected the links 7, which links are connected to the yoke 3. The steering post 5 is provided with the ordinary steering wheel 8. The parts pertaining to the steering of the vehicle form no specific part of the present invention and do not enter into the details thereof, but are shown conventionally for the purpose of illustrating a complete structure. To the frame 1 is connected and securely fixed in any convenient and well known manner the standard or support 9, to which support is pivotally attached in any convenient and well known manner the oscillating bar or frame $9^a$, which oscillating bar or frame is supported at the desired height above the top of the vehicle to allow or permit a person to sit upon the rear end of the oscillating frame or bar, a suitable seat 10 being provided. Below the oscillating frame or bar $9^a$ is located the power or grip wheel 11. The band of the grip wheel 11 is formed of sufficient width to provide suitable tripping surfaces for the gripping levers and frame or plates and at the same time to so connect the spokes of the power or grip wheel that they will not interfere with the action or movements of the gripping levers and frames or plates.

For the purpose of imparting rotary motion to the power or grip wheel 11 by the oscillation of the oscillating bar or frame $9^a$, said bar or frame is provided with the pivoted links or connecting bars 15 and 16, said links or connecting bars being located upon opposite sides of the pivoted point of the oscillating bar or frame $9^a$. To the bottom or lower end of the link or connecting bar 15 is pivotally attached the outer end of the grip lever 17, which grip lever will be further specifically described.

To the bottom or lower end of the link or connecting bar 16 is pivotally attached the oscillating lever 18, which oscillating lever is pivotally attached intermediate its ends to the post 19 or its equivalent. To the oscillating lever 18 is pivotally attached intermediate its ends the foot lever link 20; and to this foot lever link 20 and at its bottom or lower end is pivotally attached the foot lever 21, which foot lever is pivoted intermediate its ends to the post 22, which post is securely fixed to the frame 1 or its equivalent. To the inner end of the oscillating lever 18 is pivotally connected the grip lever connecting link 23, the opposite end of said link being attached to the grip lever 24, which grip lever is constructed substantially the same as the grip lever 17.

Below the front or forward end of the oscillating bar or frame 9ª is located the forward foot propelling lever or frame 25, which foot lever is pivotally attached to suitable brackets upon the frame, said foot lever being substantially of the form shown in Fig. 1, but may be of any other desired form as the only object of said foot lever is to provide means whereby power can be transmitted to the power or grip wheel 11 by means of mechanism located between said foot lever and said power or grip wheel. To the foot lever or frame 25 and intermediate its ends is pivotally attached the link or bar 26, the top or upper end of said link being pivotally attached to the front or forward end of the oscillating bar 9ª. Near the front end of the oscillating bar or frame 9ª is located the seat 27, which seat is supported upon the standard 28 and is so located that its occupant can when seated be in position to guide the vehicle as it is propelled by means of the steering wheel 7.

For the purpose of imparting rotary motion to the power or grip wheel 11 the grip levers 17 and 24 are provided, which grip levers are pivotally connected to the grip frame or plates 29 by means of the rivets 30 or their equivalents. The grip levers 17 and 24 are provided with the grip edges or surfaces 31, the faces of which are intermittently brought into frictional contact with the periphery of the power or grip wheel 11, said gripping and contact faces being brought into engagement and out of engagement with the power or grip wheel 11 by the oscillating or pivotal movement of the grip levers 17 and 24. A spring 29ª is carried by the grip plate 29 and bears upon the grip lever 24 tending to normally hold the grip surface 31 of said lever out of contact with the periphery of the grip wheel 11.

It will be understood that when oscillating movement is imparted to the oscillating bar or frame 9ª the grip levers 17 and 24 will be actuated, the grip lever 14 being so arranged with reference to the power or grip wheel 11 that it will engage the power or grip wheel 11 during its upward movement and the grip lever 17 being so arranged that it will grip the power wheel during its downward movement, thereby providing means for one of the grip levers to be brought into action during the time the other grip lever is thrown out of action by which arrangement a continuous rotation of the power or grip wheel 11 is imparted by the oscillation of the oscillating bar or frame 11.

It will be understood that in order to provide for this the grip levers should be so adjusted that both grip levers will not be brought into action and out of action at one and the same time, as it will be understood that at the time the grip lever 24 together with its plates are moving in a downward direction the side of the wheel 11 will be moving upward and while the grip lever 17 is moving upward the opposite side of the wheel will be moving down.

For the purpose of providing means for properly clamping the band of the wheel 11 the grip plates 29 are provided with the inturned lugs 32, which lugs clamp upon the inner periphery or face of the grip wheel 11, thereby clamping the band of the grip wheel 11 between the contact faces of the grip levers and the contact faces of the inturned lugs 32, at which time, and when so gripped the grip levers together with their different parts all move in the direction of the rotation of the grip or power wheel 11.

For the purpose of imparting rotary motion to the rear or propelling axle 33, said axle is provided with the sprocket wheels 34 and 35 or their equivalents, which gear or sprocket wheels are driven by means of the drive chains 36 and 37, which drive chains are driven by the sprocket wheels 38 and 39.

The operation of my manually propelled vehicle is substantially as follows: Assuming that two persons are to operate and propel the vehicle the person occupying the front seat 27 is free to guide the vehicle by his hands and to actuate the foot lever 25; and the person occupying the rear seat fixed to and carried by the oscillating bar or frame 9ª, can with his feet actuate the foot lever 21. It being understood that owing to the intermediate connections between the oscillating bar or frame 9ª and the foot lever 21 the movements of said oscillating bar or frame 9ª will be in opposite directions; that is to say when the rear end of the oscillating bar moves upward the rear end of the foot lever 21 will move downward by which arrangement the person occupying the rear seat can press downward upon the lever 21, which in turn forces the rear end of the oscillating bar upward.

By providing the propelling and grip wheel 11 and applying the power to said grip wheel by means of grip levers and grip frames, the wheel 11 can be actuated regardless of the position or positions of the grip levers and frames or of either of them with reference to each other, thereby overcoming what is commonly termed the dead center. By providing mechanism intermediate the grip or power wheel 11 and the driven axle of the vehicle, the same can be started regardless of the position of any of the parts designed and calculated to actuate and propel the vehicle.

Having fully described my invention, what I claim as new and desire to secure by Letters Patent, is—

1. In a device of the character described, the combination of a frame, a power shaft carried by said frame, a power wheel mounted upon said shaft, an oscillating element carried by the frame, grip plates provided with grip lugs, grip levers pivotally connected to the grip plates, front and rear foot levers, said front lever pivoted at its inner end and connected to the oscillating element, said rear foot lever pivoted intermediate its ends, a series of levers and links intermediate the rear foot lever and the oscillating element, the innermost link of the series of links pivotally connected to one of the grip levers, a link connecting the other of said grip levers to the oscillating element, said grip levers adapted to alternately grip and release the power wheel.

2. In a device of the character described, the combination of a frame, a power shaft carried by said frame, a power wheel mounted upon said shaft, an oscillating element carried by the frame, grip-plates provided with grip-lugs, grip-levers pivotally connected to the grip-plates, front and rear foot levers, said front foot lever pivoted at its inner end, and said rear foot lever pivoted intermediate its ends, a series of levers and links intermediate the rear foot lever and the oscillating element, the innermost link of the series of links pivotally connected to one of the grip-levers, and said grip-levers adapted to be actuated in alternate directions.

3. In a device of the character described, the combination of a frame, a power wheel carried by said frame, said power wheel provided with inner and outer grip faces, a grip plate mounted upon the power wheel, said grip plate adapted to be moved with the movement of the power wheel and to slide upon the grip faces of the power wheel, said grip plate provided with grip lugs spaced from each other, a grip lever located intermediate the grip lugs and upon the opposite face of the power wheel from the face upon which the grip lugs are located, a spring carried by said grip plate, said spring bearing upon said grip lever and adapted to hold said grip lever normally out of contact with said power wheel and means for actuating the grip lever.

In testimony that I claim the above, I have hereunto subscribed my name in the presence of two witnesses.

JACOB NEY.

Witnesses:
 JOHN H. BISHOP,
 F. W. BOND.